Patented Oct. 6, 1931

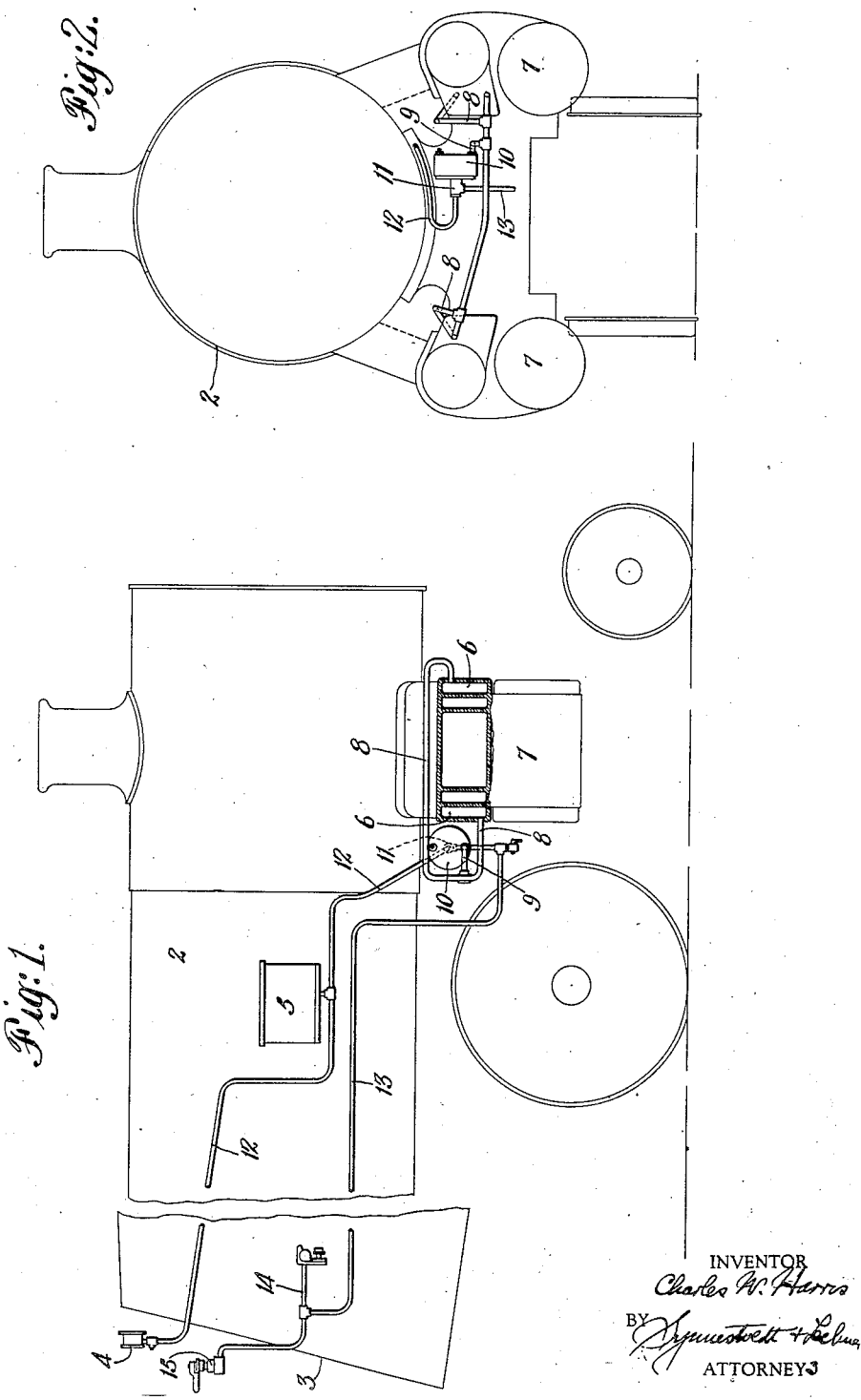

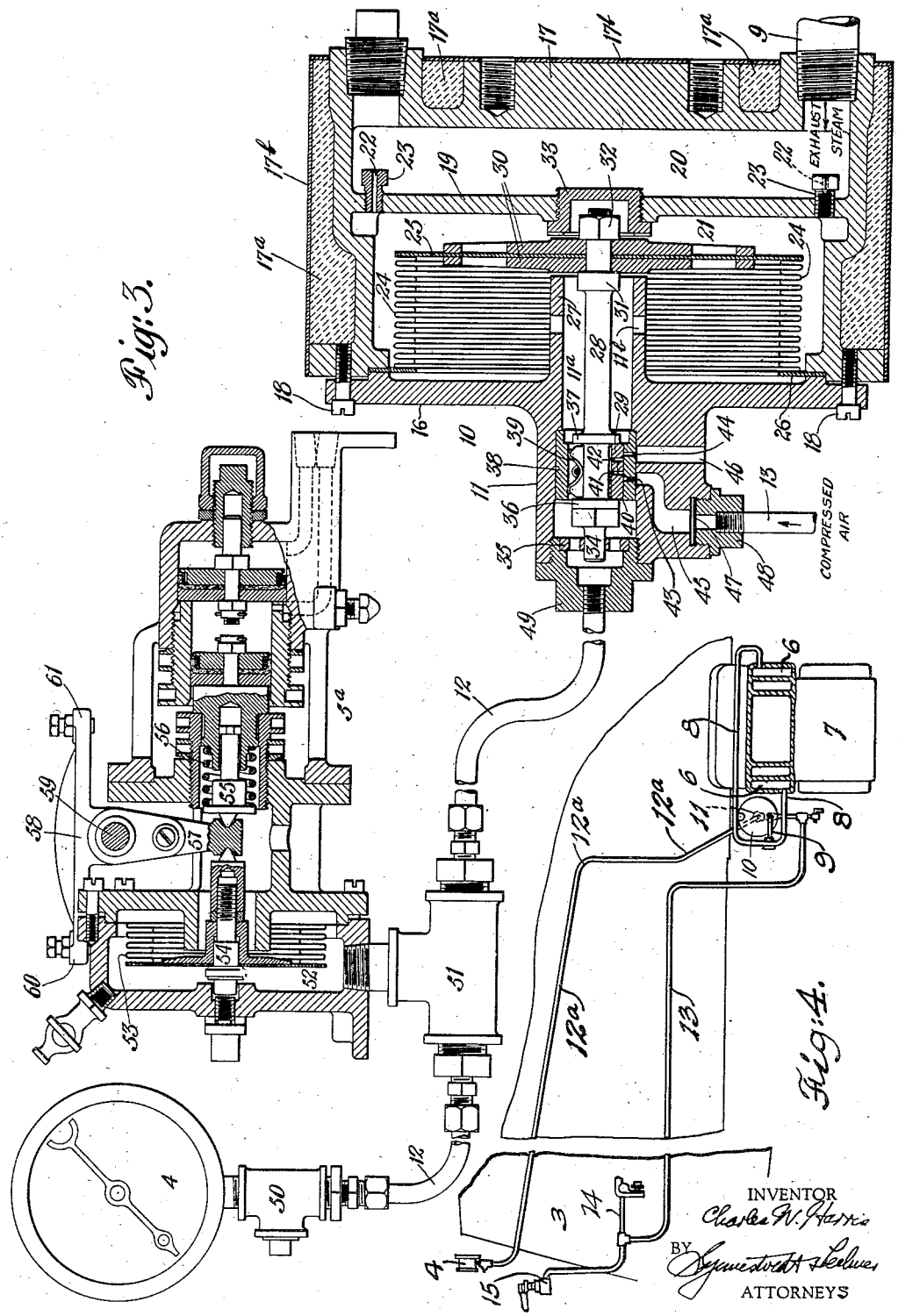

1,826,280

UNITED STATES PATENT OFFICE

CHARLES W. HARRIS, OF PROCTOR, MINNESOTA, ASSIGNOR TO TRANSPORTATION DEVICES CORPORATION, OF INDIANAPOLIS, INDIANA, A CORPORATION OF INDIANA

INDICATING AND CONTROLLING MECHANISM

Application filed November 4, 1927. Serial No. 230,965.

This invention relates to indicating and controlling mechanism, and more particularly to mechanism for transmitting or conveying pressure changes to indicators or controlling devices, and is especially useful in connection with locomotive back-pressure indicating devices and back-pressure operated cut-off controlling or adjusting devices.

One of the primary objects of the invention is to render the operation of pressure-actuated devices, particularly of the character outlined above, more accurate and certain, and to make such devices more quickly responsive to changes of the actuating pressure.

Another object of the invention is to prolong the life of pressure-responsive devices, and to reduce the maintenance cost thereof.

Further objects of the invention are to obviate inaccuracy or failure in the operation of such devices arising from conditions of weather or temperature, to eliminate clogging, corrosion, and other troubles arising from the presence of dirt, oil, acids, or other foreign substances often present in the steam or other actuating fluid, and to facilitate cleaning of those parts which are necessarily subjected to the direct action of the actuating fluid.

More specifically my invention contemplates the elimination of a direct steam connection to the indicating or controlling device; and the provision of means, in association with back-pressure actuated indicating and cut-off controlling mechanism, for conveying or transmitting the locomotive back-pressure and the changes thereof, indirectly, as it were, to the automatic cut-off controller and to the back-pressure gauge in the locomotive cab.

For the accomplishment of this I have provided what might be termed a converter. This converting device is so constructed and arranged as to smooth out to a large extent the violent exhaust impulses of the locomotive and prevent the transmission of them with their attendant shocks to the indicating and controlling mechanism. It furthermore conserves heat, eliminates freezing of the indicating and controlling mechanism in cold weather, and by eliminating the steam line to said mechanism and automatically compensating for temperature changes, as will hereinafter appear, obviates inaccuracies in the operation of said mechanism and prevents the conveying of foreign matter thereinto from the steam.

How the foregoing objects with their advantages are attained, as well as others which will occur to those skilled in the art, will be evident from the following description of the invention, taken together with the accompanying drawings which illustrate the device as applied to a locomotive equipped with a back-pressure gauge (the details of which gauge are not germane to this invention) and with an automatic back-pressure actuated cut-off controller (such as shown and described in the application of Messrs. Pearce, Retterer and Karibo, Serial No. 28,103, filed May 5, 1925, for cut-off controlling mechanism for locomotives).

In the drawings:

Fig. 1 is a fragmentary diagrammatic view of a locomotive, showing partly in elevation and partly in section, the application thereto of the apparatus of the present invention;

Fig. 2 is a view toward the right from a point behind the cylinders of the locomotive of Fig. 1;

Fig. 3 is a sectional view of the device of the invention, illustrating in detail its connection to the gauge shown in Fig. 1 and to the pilot device of the cut-off controller, said pilot device also being shown in section; and Fig. 4 is a fragmentary view, similar to Fig. 1, but illustrating a modification.

Referring first to Figs. 1 and 2, it will be seen that I have illustrated, fragmentarily, a locomotive 2 having, at the boiler backhead 3, an exhaust pressure gauge indicated at 4 (which, it will be understood, is usually positioned in the cab within sight of the engineman), and an automatic back-pressure actuated cut-off controlling mechanism indicated at 5 (which is normally mounted on the side of the boiler where it can be conveniently connected to the locomotive reversing mechanism). Ordinarily, back-pressure from the exhaust passages 6 of the cylinders 7 is conveyed by a direct pipe connection to the gauge and/or the cut-off controller, but in the construction here shown such back-pressure is transmitted by pipes or conduits 8, 9, to the converting device 10 of the present invention.

From the valve casing 11 of the converter a suitable pipe connection 12 leads to the controller 5 and to the gauge 4. A pipe 13 is connected from a suitable source of fluid pressure, such as the compressed air line 14 of the brake valve 15, to the said valve casing 11 of the converter 10.

Referring now particularly to Fig. 3, it will be seen that the converter 10, constructed with two casing members 16, 17, secured together as by bolts 18, forms a chamber which is divided by a yielding member, such as the bellows diaphragm 24, 25, into two parts, one of which parts may be further divided, as by a partition 19, into two compartments 20 and 21 having intercommunication through restricted ports 22 in the plugs 23. The locomotive exhaust steam pressure is admitted through pipe 9 into compartment 20, and from thence through ports 22 into compartment 21, where it contacts with the aforesaid diaphragm or other pressure responsive device. The bellows 24 with its disc or diaphragm 25, has a flange member 26 which is secured in place by a steam-tight joint as by clamping between the members 16 and 17 of the converter casing. The casing around the steam chamber compartments 20 and 21 is covered with a suitable heat insulating material 17a which may be secured in place by the outer shell 17b.

Behind the flexible member 24, in open communication by ports 11b with the chamber behind the diaphragm is the valve chamber 11a, the casing 11 of which is preferably formed integral with casing member 16 and inwardly extended to form an annular rib 27 housing the stem 28 of the valve 29 and also serving as an abutment to limit the movement of the inner clamping or bearing plate 30 and thus prevent too great a contraction of the bellows. The other plate 30 similarly abuts against the adjustable plug 33 in partition 19 to prevent too great an expansion of the bellows. The two plates 30 clamp or grip the disk 25 of the diaphragm and are positioned on stem 28 by the shoulder 31 and the nut 32. The outer end of stem 28 has an extension 34 adapted to reciprocate in the bearing member 35, and the valve 29 is positioned between the shoulders 36 and 37.

The valve is slidable in a bushing 38 and held, as by a spring 39, against its seat 40 on the inside of bushing 38. Passages 41, 42, of the valve are adapted to be moved into and out of registry with passages or ports 43, 44, of the bushing, which ports are respectively in communication with the passage 45 to which the pipe 13 is connected and the exhaust passage 46 which is open to the atmosphere. A screen 47 may be positioned in passage 45 by the plug 48, to prevent entry of dust or dirt along with the compressed air or other fluid entering through pipe 13. The end of valve casing 11 may conveniently be closed by a cap or plug 49 into which the pipe 12 is connected.

The gauge 4, and the pilot valve device 5a of the cut-off controller 5, are connected to pipe 12, as by the fittings 50 and 51. The connection from pipe fitting 51 leads into a chamber 52 of the pilot device 5a, in which is a bellows diaphragm 53 mounted on a stem 54. Between the end of stem 54 and the end of stem 55, which latter is under the compression of an adjustable spring 56, is positioned a depending arm 57 of a rocking member 58 which is pivoted at 59. The member 58 has also two arms, 60 and 61, which actuate other parts (not shown) of the cut-off controller, and which may be termed the cut-off lengthening and cut-off shortening arms, respectively. Further details of the structure of the device 5a will not, however, be enumerated here, since the cut-off controller is not a part of the present invention but is brought into this specification only for purposes of illustration. It will be understood that any form of cut-off controller and back-pressure gauge might be coupled at 51 and 50 to the pressure line 12.

In the operation of my device, as steam pressure from the locomotive exhaust enters compartment 20 from pipe 9, it passes through the restricted ports 22 (which tend to smooth out the severe impulses of the exhaust) and thence into compartment 21 where it compresses the bellows 24 (which, as before set forth, separates the steam and air chambers), moving valve 29, through its stem 28, to put passage 41 into registry with port 43. Air or other fluid under pressure is thereby admitted from pipe 13 to valve chamber 11a and the chamber in back of the diaphragm, and sets up a pressure therein and throughout the pipe line 12, connections 50 and 51, gauge 4, and pressure chamber 52 of pilot device 5a.

As the air so admitted overcomes the pressure in the steam chamber it expands the bellows and moves ports 41 and 43 out of registry. The valve 29 is then in the position shown in Fig. 3. Upon an increase in back-pressure from any cause, such as an increase in locomotive speed, a change in the throttle opening, or a lengthening of the valve cut-off, the bellows will be again compressed, uncovering port 43 and again admitting air to balance said back-pressure. Upon a decrease in back-pressure, such as arises from a decrease in speed, a reduction in throttle opening, or a shortening of the cut-off, the pressures on the two sides of the diaphragm will again become unbalanced, the bellows will expand, and valve passage 42 will be put into registry with port 44, exhausting air to atmosphere until a condition of balance is again restored, whereupon the valve will be in mid-position again, as shown in Fig. 3.

Since the bellows diaphragm and the valve moved thereby always function to produce a balance of pressures, air on one side and steam on the other, the exact value of the back-pressure will at all times be exerted (through the air in pipe 12) on the gauge 4 and controller 5. The engineer therefore, on engines equipped only with the gauge, will always have before him a correct indication of the back-pressure, and may operate the locomotive to a constant back-pressure by altering the cut-off, shortening it to reduce excessive back-pressure, and lengthening it to raise the back-pressure when it has dropped below the point at which the locomotive operates with greatest efficiency. Similarly, on engines equipped with the automatic cut-off regulator, changes in back-pressure, as conveyed by the air pressure in pipe 12 will immediately affect the controller to effect the change in cut-off necessary to restore normal back-pressure.

It is obvious that changes in temperature of the air in the system, causing it to expand or contract, will cause no inaccuracy at the gauge or the controller, since the valve 29 will immediately be moved by bellows 24 to exhaust or admit air as the case may be.

It will further be seen that friction of the parts will have a negligible effect, due to the large effective area of the bellows diaphragm. Furthermore, the bellows has a slight tendency to retain its normal length, which is designed to be such that the valve will at that point be in mid-position. This assures accuracy in the balance of pressure when all the valve ports are closed.

The restriction of the steam to a small part of the whole apparatus, which part is covered with thermo-insulative material, not only conserves heat but does away with the freezing often incident to running the back-pressure pipe direct to the gauge and controller, and obviates clogging up of the line from foreign elements in the steam. In addition, air, being more fluid than steam, conveys the pressure changes to the pressure-actuated devices more accurately and in less time; and its co-efficient of friction being lower, it can be conveyed in smaller pipes. Where, for example, it is common practice to employ a back-pressure pipe of one inch diameter, I may convey the pressure changes by air through a three-eighths inch pipe, which is a material advantage from a mechanical standpoint.

Obviously, the device is equally useful in the regulation of locomotive cut-off either manually or automatically; and on locomotives not equipped with an automatic control device I may run the air pipe directly to the gauge, as by the pipe 12a, indicated in the modification shown in Fig. 4.

What I claim is:—

1. In combination with a device controllable by changes in back-pressure, movable means acted upon on one side by said back-pressure, and an air conduit between the other side of said means and said device containing compressed air balancing said back-pressure, together with air supply and exhaust means for said conduit having valve means controlling the same actuated by movement of said movable means to maintain the balance of pressures.

2. The combination, with an exhaust-pressure-operated device, of a line from the source of exhaust pressure to said device, and yielding pressure-responsive means interposed in and dividing said line, the part of the line between said means and said device containing a separate fluid under pressure, together with fluid inlet and exhaust means for said portion of said line, controlled by the movement of said yielding means to maintain the two pressures in balance.

3. The combination, with an exhaust-pressure-operated device, of a line from the source of exhaust pressure to said device, and yielding pressure-responsive means interposed in and dividing said line, the part of the line between said means and said device being adapted to contain a fluid, together with fluid inlet and exhaust means for said portion of said line for admitting and exhausting a separate fluid under pressure, with valve means under the influence of said yielding means operating to maintain a balance of pressure on the two sides of the yielding means.

4. In apparatus of the character described, a pressure transmitter comprising a chamber, a yielding member dividing the same, inlet means for admitting fluid pressure to the chamber on one side of said yielding member, outlet means communicating with the chamber on the other side of said yielding member, and means for retaining fluid pressure in said outlet means and its communicating portion of the chamber, together with balancing means for the two pressure fluids including admission and exhaust ports and valve means therefor.

5. In apparatus of the character described, a pressure transmitter comprising a chamber, a yielding member dividing the same, inlet means for admitting fluid pressure to the chamber on one side of said yielding member, outlet means communicating with the chamber on the other side of said yielding member, and means for retaining fluid pressure in said outlet means and its communicating portion of the chamber, together with balancing means for the two pressure fluids including admission and exhaust ports and valve means therefor actuated by said yielding member.

6. In apparatus of the character described, a pressure transmitter comprising a chamber. a yielding member dividing the same, inlet means for admitting fluid pressure to the chamber on one side of said yielding member, outlet means communicating with the chambed on the other side of said yielding member, and means for admitting and retaining fluid pressure in said outlet means and its communicating portion of the chamber, together with means for quenching pulsations in the fluid pressure.

7. In apparatus of the character described, a pressure transmitter comprising a chamber, a yielding member dividing the same, inlet means for admitting fluid pressure to the chamber on one side of said yielding member, outlet means communicating with the chamber on the other side of said yielding member, and means for admitting and retaining fluid pressure in said outlet means and its communicating portion of the chamber, together with means for quenching pulsations in the fluid pressure including a restricted port between the inlet means and the yielding member.

8. In apparatus of the character described, a pressure transmitter comprising a chamber, a yielding member dividing the same, inlet means for admitting fluid pressure to the chamber on one side for said yielding member, outlet means communicating with the chamber on the other side of said yielding member, and means for admitting and retaining fluid pressure in said outlet means and its communicating portion of the chamber, together with means for quenching pulsations in the fluid pressure comprising a baffle wall between the inlet means and the yielding member having a restricted port therethrough.

9. In mechanism of the character described, a source of steam under pressure, a pressure-actuated device, and means for indirectly actuating said device by said steam pressure comprising a divided chamber adjacent said source of steam one part of which chamber is connected thereto, yielding means forming the division between the parts of the chamber, and a fluid conduit connecting another part of the chamber to said pressure-actuated device, together with means for maintaining a separate fluid under pressure in said conduit and in balance with said steam pressure.

10. In mechanism of the character described, a source of steam under pressure, a pressure-actuated device, and means for indirectly actuating said device by said steam pressure comprising a divided chamber adjacent said source of steam one part of which chamber is connected thereto, yielding means forming the division between the parts of the chamber, and a fluid conduit connecting another part of the chamber to said pressure-actuated device, together with means for maintaining a separate fluid under pressure in said conduit and in balance with said steam pressure said means being actuated by said yielding means.

11. In combination with a source of variable pressure and a pressure-responsive device, a pressure transmitting system including a fluid containant connected to the pressure responsive device, a diaphragm balanced between said variable pressure on one side and the fluid in said containant on the other, a source of pressure for said fluid, and a valve operatively associated with said diaphragm and constructed to open said containant to said source of fluid pressure or to atmosphere, respectively, upon rise or fall in the variable pressure, and to close the same upon restoration of the balance of pressures on the two sides of the diaphragm.

12. In combination with a source of variable pressure and a pressure-responsive device, a pressure transmitting system including a fluid containant connected to the pressure responsive device, a diaphragm balanced between said variable pressure on one side and the fluid in said containant on the other, a source of pressure for said fluid, and a valve operatively associated with said diaphragm and constructed to open said containant to said source of fluid pressure or to atmosphere, respectively, upon rise or fall in the variable pressure, and to close the same upon restoration of the balance of pressures on the two sides of the diaphragm, together with a dampener for the variable pressure impulses to prevent violent movements of the diaphragm and valve.

13. In combination with a source of variable pressure fluid and a pressure-responsive device, a pressure transmitting system closely connected with said source and remotely with said device, the connection to said device containing a secondary fluid under a separate source of pressure, said transmitting system including a flexible member subjected to the variable pressure fluid on one side and to the secondary fluid on the other, and means operable by changes in pressure of the variable fluid on said flexible member to balance said change by admitting more secondary fluid from its source of supply or exhausting some of it to atmosphere, as the case may be.

14. In a locomotive, a pressure-responsive device operable in direct proportion to locomotive back-pressure, a conduit from the source of back-pressure to said device, a diaphragm in said conduit, a valve connected to the diaphragm, a pair of ports having communication with the conduit between said device and said diaphragm and alternatively uncoverable by said valve, and a source of air-pressure connected to one port, the other port leading to atmosphere.

15. The combination, with a pressure-operated device, of a line from the source of pressure to said device, and yielding pressure-responsive means interposed in and dividing said line, the part of the line between said means and said device containing a separate fluid under pressure together with fluid inlet and exhaust means for said part of said line, controlled by the movement of said yielding means to maintain the two pressures at given ratios.

In testimony whereof I have hereunto signed my name.

CHARLES W. HARRIS.